(12) United States Patent
Kim

(10) Patent No.: US 7,487,884 B2
(45) Date of Patent: Feb. 10, 2009

(54) OPEN-TYPE TRAY HAVING A DOOR CONFIGURED TO BE RECEIVED WITHIN AN INNER SIDE THEREOF

(75) Inventor: Young-seok Kim, Seongnam-shi (KR)

(73) Assignee: Hyundai Mobis Co., Ltd., Seoul (KR)

( * ) Notice: Subject to any disclaimer, the term of this patent is extended or adjusted under 35 U.S.C. 154(b) by 535 days.

(21) Appl. No.: 10/810,822

(22) Filed: Mar. 29, 2004

(65) Prior Publication Data
US 2005/0133523 A1    Jun. 23, 2005

(30) Foreign Application Priority Data
Dec. 18, 2003    (KR) .................... 10-2003-0092948

(51) Int. Cl.
| | |
|---|---|
| B65D 43/14 | (2006.01) |
| B65D 43/22 | (2006.01) |
| B65D 45/16 | (2006.01) |
| B60R 7/06 | (2006.01) |
| B60R 7/00 | (2006.01) |

(52) U.S. Cl. ................... 220/827; 220/830; 220/836; 220/324; 224/483; 296/37.8

(58) Field of Classification Search ............ 296/37.12, 296/24.34, 37.8; 220/324, 827, 830, 836, 220/845; 224/498, 495, 483
See application file for complete search history.

(56) References Cited

U.S. PATENT DOCUMENTS 6,883,680 B2 *    4/2005    Hirose .................. 220/830
7,025,225 B2 *    4/2006    Inari .................... 220/830
7,063,225 B2 *    6/2006    Fukuo .................. 220/264
7,231,692 B2 *    6/2007    Harada ................. 16/345
2003/0071047 A1 *    4/2003    Harada ................. 220/835

FOREIGN PATENT DOCUMENTS

| JP | 62210150 | 9/1987 |
|---|---|---|
| JP | 2000-247186 | 9/2000 |

OTHER PUBLICATIONS

English Language Abstract of JP 62-210150.
English Language Abstract of JP 2000-247186.

* cited by examiner

*Primary Examiner*—Robin Hylton
(74) *Attorney, Agent, or Firm*—Greenblum & Bernstein, P.L.C.

(57) ABSTRACT

The present invention provides a structure for receiving a door into an upper side when the door of a tray installed at a center facia of an automobile is operated. When the door of the tray is operated, a production of interference between a gearshift lever and other parts is minimized and thus increases spatial utilization. A locking device is installed at a corresponding portion to the housing and the door to selectively open/close the door installed at the front part of the housing. Each of connecting member is formed at both sides of the door to receive a force of opening the door, with the locking device released. A rotary member, having one end hinge connected to the connecting member and the other end provided with peripheral teeth, is rotatably installed to side surface organic the housing. A resilient member rotates the rotary member to move the connecting member, thereby opening the door. A damper member facilitates to open the door with an even speed.

3 Claims, 5 Drawing Sheets

US 7,487,884 B2

OPEN-TYPE TRAY HAVING A DOOR CONFIGURED TO BE RECEIVED WITHIN AN INNER SIDE THEREOF

RELATED APPLICATION

The present disclosure relates to subject matter contained in Korean application No. 2003-92948, filed on Dec. 18, 2003, which is herein expressly incorporated by reference its entirety.

BACKGROUND OF THE INVENTION

1. Field of the Invention

The present invention relates to an open-type tray, and more specifically to an open-type tray capable of maximizing spatial utilization by having the door be received into an inner side of a tray, when the door of the tray mounted on a facia by using a double-hinge structure is opened.

2. Description of the Related Art

As shown in FIG. 1, a tray 3 for storing small items is installed at a center facia 1 of an automobile. A door 5 is installed at the front surface of the tray 3. The door 5 is connected by a hinge to the tray 3 at its lower end to be opened toward a gearshift lever 7 on its operation.

As shown therein, when the gearshift lever 7 is operated with the door 5 of the tray 3 opened, a driver suffers inconvenience in operating the gearshift lever 7 since the gap between the door 5 of the tray 3 and the gearshift lever 7 is too narrow.

That is, in the prior art tray structure, since the door 5 of the tray 3 installed at the front center facia 1 of an automobile is opened with protruding outward, the gap between the gearshift lever and the other parts becomes narrow resulting in inconvenience during use.

SUMMARY OF THE INVENTION

It is an object of the present invention to provide an open-type tray capable of preventing inconvenience during use from occurring due to interference or a narrow gap between the other parts generated when a door of a tray installed at the center facia of an automobile is opened with its outward deployment.

In accordance with the present invention, there is provided an open-type tray comprising: a locking device installed at a corresponding portion of a housing and a door to selectively open/close the door installed at a front surface of the housing; a connecting member formed at each of both ends of the door to receive a force for opening the door with the locking device released; a rotary member hinge connected to the connecting member at its one end, of which circular shaped teeth are formed at the other end, and rotatably installed at a side surface of the housing; a resilient member for opening the door by moving the connecting member hinge connected to the rotary member by rotating the rotary member with a resilient recovery force; and a damper member, of which circular shaped teeth for engaging with arc shaped teeth formed at the other end of the rotary member is formed at its periphery, and set to be rotated at a uniform speed.

Preferably, the tray of the present invention further comprises a guide protrusion formed at one end of the connecting member in order to guide the path of the door moved by the damper member, and a guide rail formed at a side surface to guide an insertion of the guide protrusion.

In addition, the resilient member is mounted at the rotary member at one end by using a coil spring and fixed to the side surface of the housing at the other end to provide a rotational force to the connecting member by a resilient recovering force in the direction of opening the door.

Further, a stopper is protruded at an outer surface of the housing to limit a rotation angle of the rotary member when the door is opened.

In accordance with the present invention as described hereinabove, there is an effect capable of maximizing spatial utilization by minimizing interference between a gearshift lever and the other parts with relation to an operation of the door of the tray.

BRIEF DESCRIPTION OF DRAWINGS

Other objects and aspects of the present invention will become apparent from the following description of embodiments with reference to the accompanying drawings in which.

DESCRIPTION OF THE PREFERRED EMBODIMENT

Hereinafter, a preferred embodiment of the present invention will be described in conjunction with the accompanying drawings.

Figure 1:
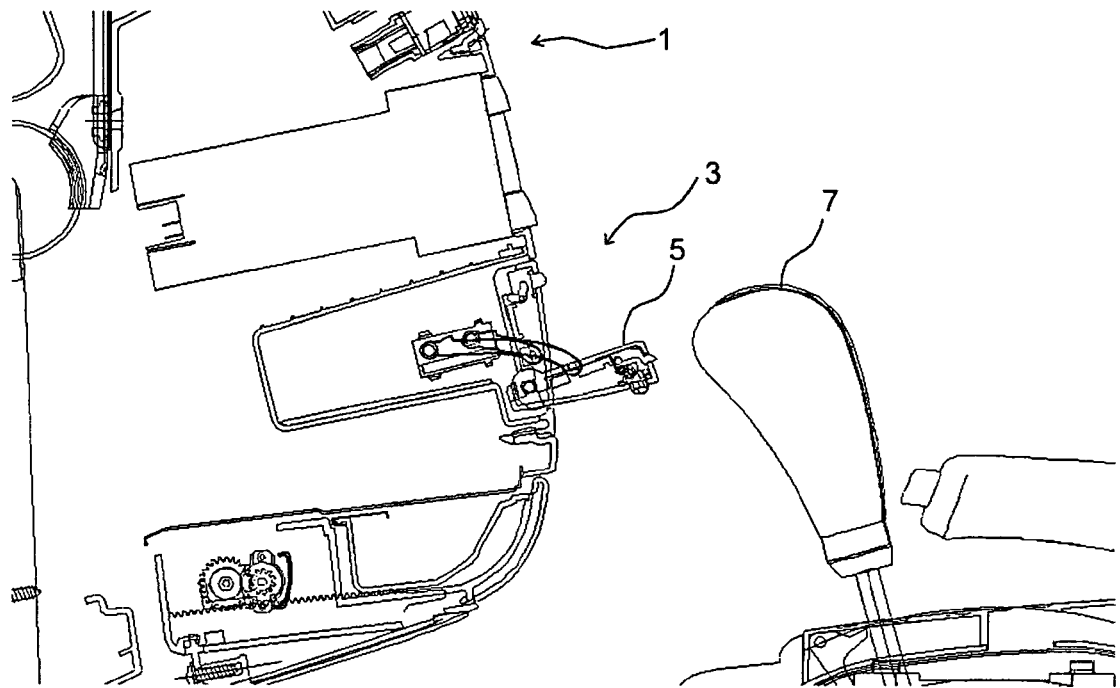
FIG. 1 is side cross-sectional view for illustrating a state that a tray is installed at a center facia of an automobile in accordance with the prior art.
Figure 2:
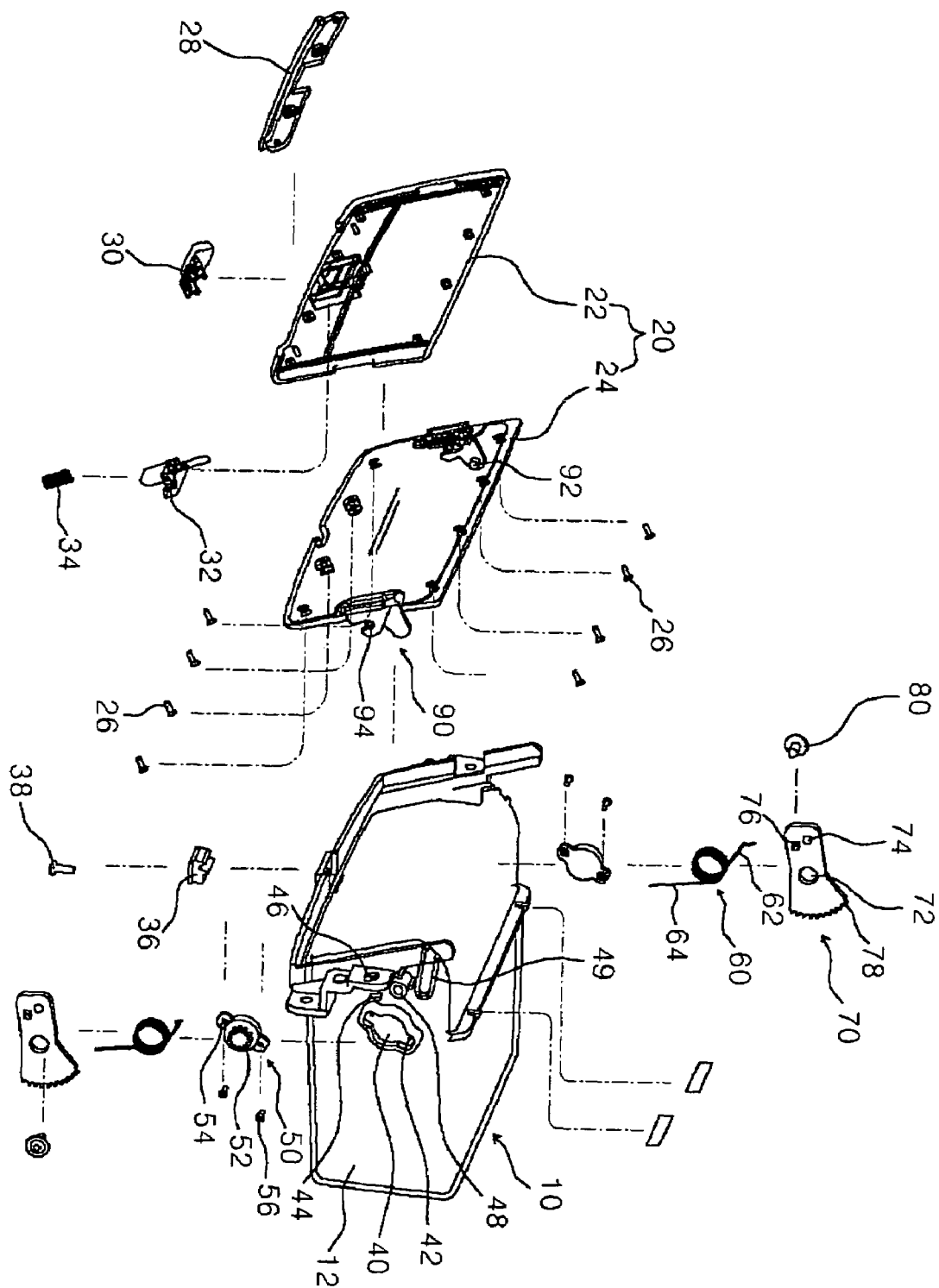
FIG. 2 is an exploded perspective view of an open-type tray in accordance with a preferred embodiment of the present invention.
Figure 3:
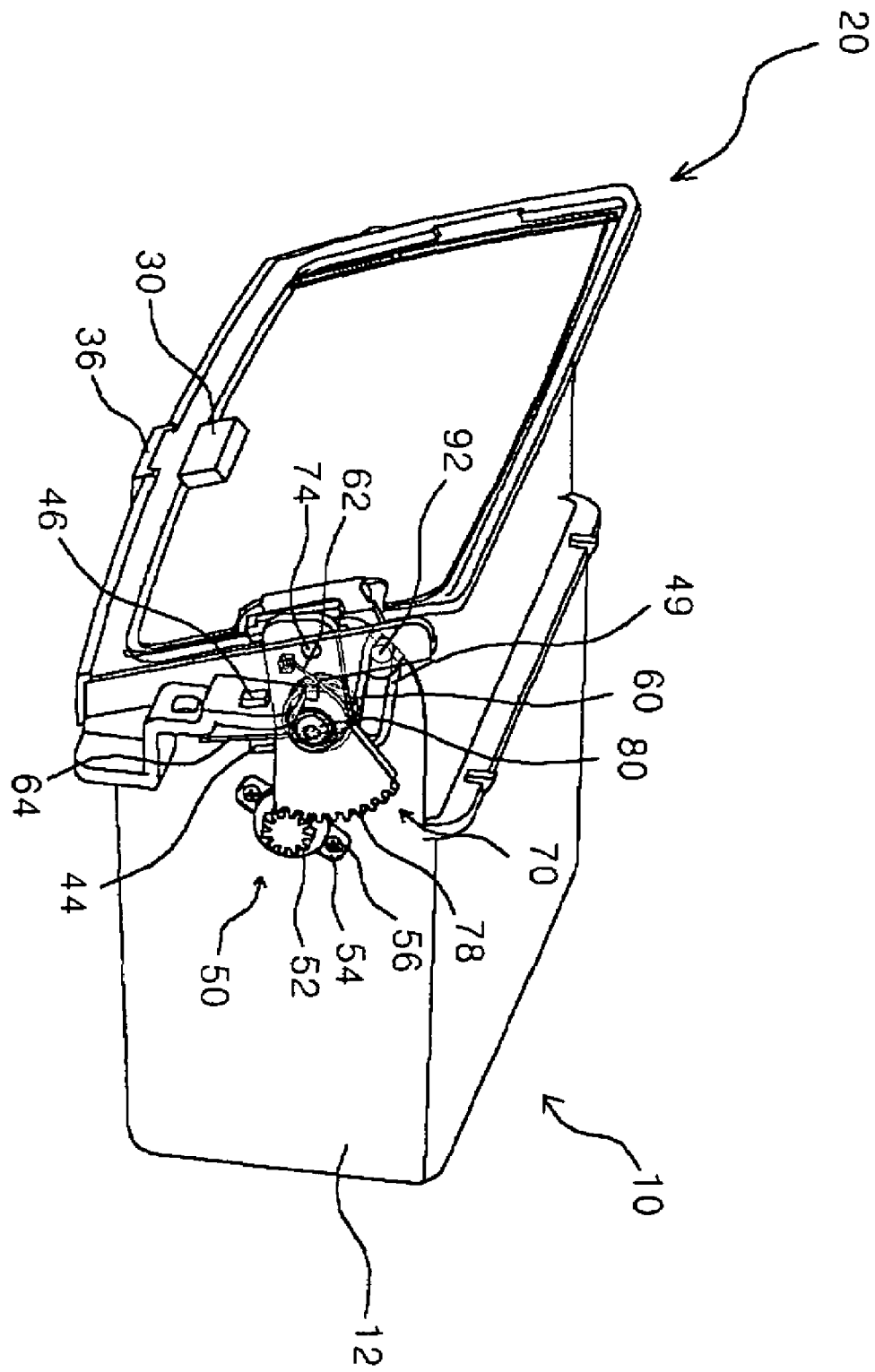
FIG. 3 is a view for illustrating a state that the door is closed with the open-type tray shown in FIG. 2 engaged.
Figure 4:
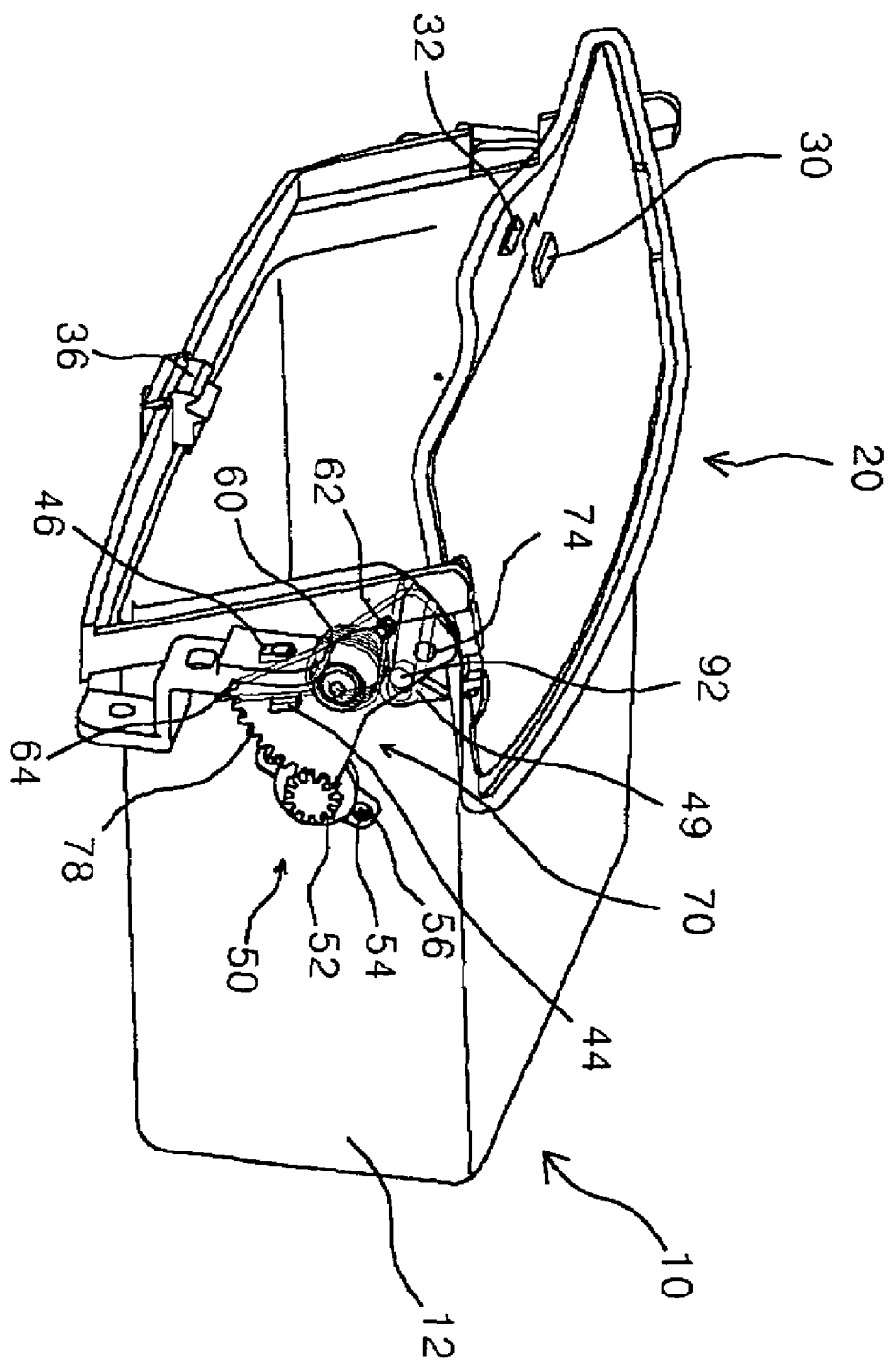
FIG. 4 is a view for illustrating a state that the door is opened with the open-type tray shown in FIG. 2 engaged.
Figure 5:
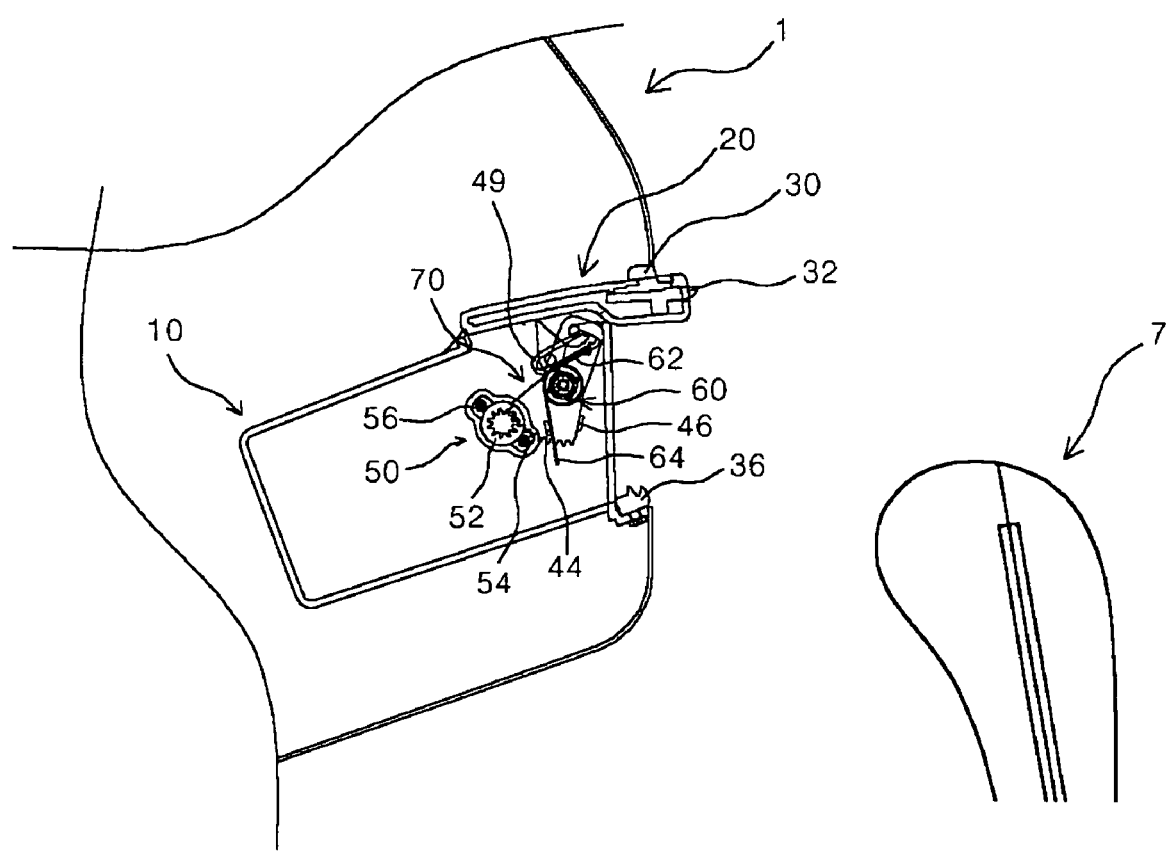
FIG. 5 is a side cross-sectional view for illustrating a center facia of an automobile at which the open-type tray in accordance with the preferred embodiment of the present invention is installed.

FIG. 2 is an exploded perspective view of an open-type tray in accordance with a preferred embodiment of the present invention; FIG. 3 is a view for illustrating that when the door is closed with the open-type tray shown in FIG. 2 engaged; FIG. 4 is a view for illustrating the opened state of the door with the open-type tray shown in FIG. 2 engaged; and FIG. 5 is a side cross-sectional view for illustrating a center facia of an automobile at which the open-type tray in accordance with the preferred embodiment of the present invention is installed.

As shown in FIGS. 2 to 4, a housing 10 in which a receiving space is formed and is provided with side surfaces 12 at its both sides.

A door 20 for opening/closing the front surface of the housing 10 is, as shown in FIG. 2, divided into an outer door 22 and an inner door 24 engaged with each other by a door screw 26.

An ornament portion 28, which is configured to provide ornamentation to a side of the outer door 22, is engaged with a lower part of the outer door 22 provided with a hooking button 30 protruded in contact with the ornament portion 28.

In addition, a hooking protrusion 32 is projected to a lower end of the door 20, and the hooking protrusion 32 has a predetermined force by a spring 34.

A latch 36, at which the hooking protrusion 32 is resiliently hooked, is fixed to a lower side of a front surface of the housing 10 by a screw 38.

The hooking protrusion 32 and the latch 36 are components constituting a locking device in accordance with the present invention.

Further, a side portion of the side surface 12 of the housing 10 is protruded to form a brim portion, an installation groove 40 having a predetermined space is formed at an inner side surrounded by the brim portion, and fastening holes 42 are formed at both sides of the installation groove 40.

A fixing protrusion 44 in the vicinity of the installation groove 40 is protruded from the side surface 12 of the housing 10, and a stopper 46 for a rotary member is spaced apart from the fixing protrusion 44, thereby forming a shape protruded from the side surface 12 of the housing 10 more than the fixing protrusion 44.

A rotary shaft 48 having a fastening hole therein is protruded at an upper side of the stopper 46, and a guide rail 49 having a groove shape for guiding the direction of the door 20 is provided at an upper side of the rotary shaft 48.

A damper member 50 mounted at the installation groove 40 is provided with a rotatable circular teeth 52 at its one side, fixing portions 54 having a through-hole therein are formed at both sides of the damper member 50, and the fixing portion 54 and the fastening hole 42 are interlocked by a fastening screw 56.

The damper member 50 accomplishes a reduction of the rotational speed of the circular teeth 52 below a predetermined speed; generally using hydraulic pressure.

A resilient member 60 is inserted into the rotary shaft 48, and the present invention uses a coil spring as the resilient member 60.

An upper bar 62 of one end of the resilient member 60 is inclined toward an upper side, and a lower bar 64 of the other end of the resilient member 60 is extended toward a lower side.

A rotary member 70 rotated by a resilient recovering force of the resilient member 60 is provided with a center hole 72 for inserting the rotary shaft 48 at its center, and a connecting hole 74 and a fixing groove 76 at its one side about the center hole 72.

Further, the rotary member 70 is provided with fan-shaped teeth 78 having peripheral teeth at the other end.

In order to rotatably install the resilient member 60 and the rotary member 70 sequentially engaged with the rotary shaft 48, a head of a fixing screw 80 engaged with the rotary shaft 48 has a diameter larger than that of the center hole 72.

In addition, a connecting member 90 protruded from the side surface of the door 20 includes a guide protrusion 92 inserted into the guide rail 49 for guiding a moving of the door and a connecting groove 94 corresponding to the connecting hole 74 of the rotary member 70.

The connecting hole 74 and the connecting groove 94 is interconnected by a separate member such as a pin to move the door 20 by an operation of the rotary member 70.

Components comprising the installation groove 40, the fixing protrusion 44, the stopper 46, the damper member 50, the resilient member 60 and the rotary member 70, for opening/closing the door to the upper side of the housing 10, are installed at both sides of the housing 10 rather than on only one side of the housing 10.

The installed state of the open-type tray as described hereinabove in accordance with the present invention will be described hereinafter.

The resilient member 60 and the rotary member 70 are sequentially engaged with the rotary shaft 48 mounted by the fixing screw 80 with a rotatable state.

The connecting hole 74 of the rotary member 70 is interconnected to the connecting groove 94 of the connecting member 90 by a separate member, and one end of the upper bar 62 of the resilient member 60 is fixedly inserted into the the fixing groove 76 of the rotary member 70.

In addition, the fan-shaped teeth 78 of the rotary member 70 are engaged with the circular teeth 52 of the damper member 50 fixed to the installation groove 40.

One directional rotation of the lower bar 64 of the resilient member 60 is restricted by the fixing protrusion 44 protruded at the side surface 12 of the housing 10.

Further, the guide protrusion 92 protruded at one side of the connecting member 90 for receiving a force by the rotary member 70 is inserted and installed at the guide rail 49 to move along the guide rail 49.

The operation of the open-type tray as described hereinabove in accordance with the preferred embodiment of the present invention will be described hereinafter.

The door 20 maintains a closed state in front of the housing 10 before a predetermined force is biased when the hooking protrusion 32 is hooked by the latch 36.

When the door 20 is closed, as shown in FIG. 3, the upper bar 62 of the resilient member 60 inserted into the fixing hole of the rotary member 70 is lifted down along the rotary member 70.

Therefore, the rotary member 70 is rotated clockwise (with reference to FIG. 3) by the resilient recovering force of the resilient member 60, but, the door 20 does not rotated to maintain the closed state since the hooking protrusion 32 is hooked by the latch 36.

In this state, as shown in FIG. 4, the hooking protrusion 32 is released from the hooked state at the latch 36 by operating the hooking button 30, the rotary member 70 is rotated about a center axis by the resilient recovering force of the resilient member 60.

Therefore, the connecting member 90 connected to the rotary member 70 is also rotated, and coincidently the door 20 is moved up to the upper portion of the housing 10 by moving the guide protrusion 92 of the connecting member 90 along the guide rail 49.

In addition, a rotational angle of the rotary member 70 is set to be rotated only within a predetermined angle by hooking the one side of the rotary member 70 to the stopper 46 when the rotary member 70 is rotated by the resilient member 60.

Further, engaged rotation of the fan-shaped teeth 78 of the rotary member 70 and the circular teeth 52 of the damper member 50 reduces the biased rotational force by the damper member 50 to make the opening/closing operation of the door 20 smooth.

The operation by the components as described hereinabove can make more stable operating state since the operation is accomplished at both sides of the door 20, respectively.

On the other hand, as shown in FIG. 5, in case the open-type tray is installed at the center facia 1 of an automobile, the door 20 is capable of maximizing a spatial utilization by securing a distance to the gear shaft lever 7 by entering into the upper portion of the housing 10 rather than projecting outward from the housing when the door 20 is opened.

In accordance with the present invention as described hereinabove, various embodiments will be apparent from the principle technical spirit that the tray is operated by a double-hinge structure by using a primary hinge which the rotary member 70 is rotated about the rotary shaft 48, and a secondary hinge which the door is rotated by connecting the rotary member 70 and the connecting member 90.

As described hereinabove, the open-type tray in accordance with the present invention is capable of maximizing a spatial utilization by preventing inconvenience during use due to interference and a narrow gap between other parts since the door is opened by entering into the upper portion of the housing, when the door of the tray, for receiving small parts, installed at the center facia of an automobile, is opened.

While this invention has been described in connection with what is presently considered to be the most practical and preferred embodiment, it is to be understood that the invention is not limited to the disclosed embodiment, but on the contrary, it is intended to cover various modification within the spirit and the scope of the appended claims.

What is claimed is:

1. A tray comprising:
   a latch provided in a lower side of a front surface of a housing and configured to receive a resilient hooking protrusion, and a door installed at a front surface of the housing, the door selectively opening/closing the front surface of the housing, the resilient hooking protrusion mounted on the door;
   a connecting member fixed at each opposite end of the door to receive a force that opens the door when the latch is released, the connecting member including a first extending portion having a connecting groove provided at a side thereof and a second extending portion having a guide protrusion on a side thereof, the first extending portion and the second extending portion spaced apart from each other;
   a rotary member configured to interconnect with the connecting groove of the connecting member at one end thereof, the rotary member configured to be hinged to a rotary shaft provided on the housing, the rotary member having an arc shaped toothed portion formed at another end thereof, and rotatably installed at a side surface of the housing;
   a resilient member that opens the door by moving the connecting member hinged to the rotary member by rotating the rotary member, one end of the resilient member being disposed in a fixing groove provided in the rotary member and another end of the resilient member being disposed on a fixing protrusion provided in the housing;
   a damper fixed to the housing, the damper having a toothed circular portion, the teeth of which engage with the teeth of the arc shaped toothed portion of the rotary member; and
   a guide protrusion inserted in a guide rail in order to guide a moving path of the door moved by the damper member, the guide protrusion protruded at one side of the connecting member to receive a force by the rotary member; and
   the guide rail fixed at a housing side surface to guide the guide protrusion during opening/closing of the door, the guide rail having a groove shape to guide a direction of the door.

2. The tray according to claim 1, wherein the resilient member comprises a coil spring mounted on the rotary member, with one end of the coil spring engaging the rotary member and another end fixed to the side surface of the housing to provide a rotational force to the connecting member by a resilient recovering force in the direction of opening the door.

3. The tray according to claim 1, wherein a stopper protrudes from the outer surface of the housing to limit a rotation angle of the rotary member when the door is opened.

* * * * *